(12) United States Patent  (10) Patent No.: US 8,739,126 B2
Glaser et al.  (45) Date of Patent: May 27, 2014

(54) WEB SERVICES ENVIRONMENT TESTING FRAMEWORK

(75) Inventors: Scott Glaser, Dublin, CA (US); Nitin Patlola, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 400 days.

(21) Appl. No.: 12/947,648

(22) Filed: Nov. 16, 2010

(65) Prior Publication Data

US 2012/0059919 A1 Mar. 8, 2012

Related U.S. Application Data

(60) Provisional application No. 61/380,042, filed on Sep. 3, 2010.

(51) Int. Cl.
G06F 9/44 (2006.01)
G06F 15/16 (2006.01)
G06F 15/173 (2006.01)

(52) U.S. Cl.
USPC ........... 717/124; 717/126; 717/131; 717/135; 709/219; 709/223

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |

(Continued)

OTHER PUBLICATIONS

Xiaoying Bai et al., "WSDL-Based Automatic Test Case Generation for Web Services Testing",[Online],IEEE 2005, pp. 1-6, [Retrived from Internet on Feb. 8, 2013] <http://citeseerx.ist.psu.edu/viewdoc/download?doi=10.1.1.124.8469&rep=rep1&type=pdf>.*

(Continued)

Primary Examiner — Thuy Dao
Assistant Examiner — Ziaul A Chowdhury
(74) Attorney, Agent, or Firm — Ingrassia Fisher & Lorenz, P.C.

(57) ABSTRACT

A method of testing web services using a web service testing framework can include using a data parser to parse data for the web service to be tested. The data parser may be one of a plurality of data parsers in a test library for support of a plurality of data formats for the web service. If the web service is in a simple object access protocol (SOAP) protocol, the data can be converted into framework objects. These framework objects for the simple object access protocol (SOAP) protocol may then be converted into test objects. If the web service is in a representational state transfer (REST) protocol, the data itself can be converted into the test objects. A web service test can be accessed from the test library for testing the web service. The web service test can be executed using the test objects.

17 Claims, 10 Drawing Sheets

(56) References Cited

U.S. PATENT DOCUMENTS

| | | | |
|---|---|---|---|
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,473,794 B1 * | 10/2002 | Guheen et al. | 709/223 |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,340,411 B2 | 3/2008 | Cook | |
| 7,421,679 B2 * | 9/2008 | Hansen et al. | 717/124 |
| 7,437,714 B1 * | 10/2008 | Hahn et al. | 717/124 |
| 7,503,031 B2 * | 3/2009 | Chang et al. | 717/101 |
| 7,620,655 B2 | 11/2009 | Larsson et al. | |
| 7,669,187 B2 * | 2/2010 | Liu et al. | 717/124 |
| 7,698,160 B2 | 4/2010 | Beaven et al. | |
| 7,752,607 B2 * | 7/2010 | Larab et al. | 717/135 |
| 7,908,590 B1 * | 3/2011 | Min et al. | 717/124 |
| 7,954,091 B2 * | 5/2011 | Li et al. | 717/135 |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,145,726 B1 * | 3/2012 | Roche et al. | 709/219 |
| 8,275,836 B2 | 9/2012 | Beaven et al. | |
| 8,429,614 B2 * | 4/2013 | Zhang et al. | 717/124 |
| 8,495,579 B2 * | 7/2013 | Cormier et al. | 717/126 |
| 8,607,203 B1 * | 12/2013 | Mehra | 717/131 |
| 2001/0044791 A1 | 11/2001 | Richter et al. | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0150026 A1 * | 7/2006 | Kolawa et al. | 714/38 |
| 2006/0168515 A1 * | 7/2006 | Dorsett et al. | 715/513 |
| 2008/0066009 A1 * | 3/2008 | Gardner et al. | 715/809 |
| 2009/0319832 A1 * | 12/2009 | Zhang et al. | 714/38 |
| 2010/0095266 A1 * | 4/2010 | Novak | 717/101 |

OTHER PUBLICATIONS

W. T. Tsai et al., "A Robust Testing Framework for Verifying Web Services by Completeness and Consistency Analysis",[Online], IEEE 2005, pp. 1-8, [Retrieved from Internet on Feb. 8, 2013], <http://ieeexplore.ieee.org/stamp/stamp.jsp?tp=&arnumber=1551143>.*

W. T. Tsai et al., "Coyote: An XML-Based Framework for Web Services Testing", [Online], IEEE 2002, pp. 1-2, [Retrieved from Internet on Feb. 11, 2013], <http://ieeexplore.ieee.org/stamp/stamp.jsp?tp=&arnumber=1173120>.*

Xiaoying Bai et al., "A Multi-Agent Based Framework for Collaborative Testing on Web Services", [Online], IEEE 2006, pp. 1-6, [Retrieved from Internet on Mar. 21, 2014], <http://student.cse.fau.edu/~jsloan11/CEN6076/009_MasTestFramework.pdf>.*

Jaehyoun Kim et al., "The Role of Design Components in Test Plan Generation", [Online], 2001, pp. 140-152, [Retrieved from Internet on Mar. 21, 2014], <http://download.springer.com/static/pdf/775/chp%253A10.1007%252F3-540-44800-4_13.pdf>.*

Zorica Mihajovic et al., "A Knowledge-Based Test Plan Generator for Incremental Unit and IntegrationSoftware Testing", [Online], 1998, pp. 191-211, [Retrieved from Internet on Mar. 21, 2014], <http://onlinelibrary.wiley.com/doi/10.1002/(SICI)1099-1689(199812)8:4%3C191::AID-STVR168%3E3.0.CO;2-9/pdf>.*

Siripol Noikajana et al., "An Improved Test Case Generation Method for Web Service Testing from WSDL-S and OCL with Pair-wise Testing Technique", [Online], IEEE 2009, pp. 115-123, [Retrieved from Internet on Mar. 21, 2014], <http://ieeexplore.ieee.org/stamp/stamp.jsp?tp=&arnumber=5254272>.*

* cited by examiner

WEB SERVICES ENVIRONMENT TESTING FRAMEWORK

CLAIM OF PRIORITY

This application claims the benefit of U.S. Provisional Patent Application 61/380,042 entitled WEB SERVICES ENVIRONMENT TESTING FRAMEWORK, filed Sep. 3, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The subject matter described herein relates generally to a test framework for an on-demand service environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In order to provide test coverage for web services or applications, different testing tools are typically utilized for different web service protocols, as well as different data types. For example, one test tool might be used to test a simple object access protocol (SOAP) based web service, while a different test tool is used to test a representational state transfer (REST) based web service. Thus, performing a full testing of various web service protocols and data types may require working with different test tools from different vendors, making it more difficult to test web services across a wide variety of web environments.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Example General Overview

Approaches are provided for a web service testing framework. These approaches, such as various apparatuses, systems, and methods, are described herein with reference to examples applicable to a multi-tenant database system. These approaches are also applicable to many other computing environments, including an MS Windows operating system environment, any web-browsing environment, an Apple OS operating environment, a cellular phone environment, etc.

As used herein, an example multi-tenant database system includes those systems in which various elements of hardware and software of the database system may be shared by one or more customers. For example, a given application server may simultaneously process requests for a great number of customers, and a given database table may store rows for a potentially much greater number of customers.

Example System Overview

As noted above, the example multi-tenant database system as described herein represents only one possible example system where particular embodiments may be utilized. One or more embodiments are applicable to a wide variety of other systems and/or arrangements.

Figure 1:
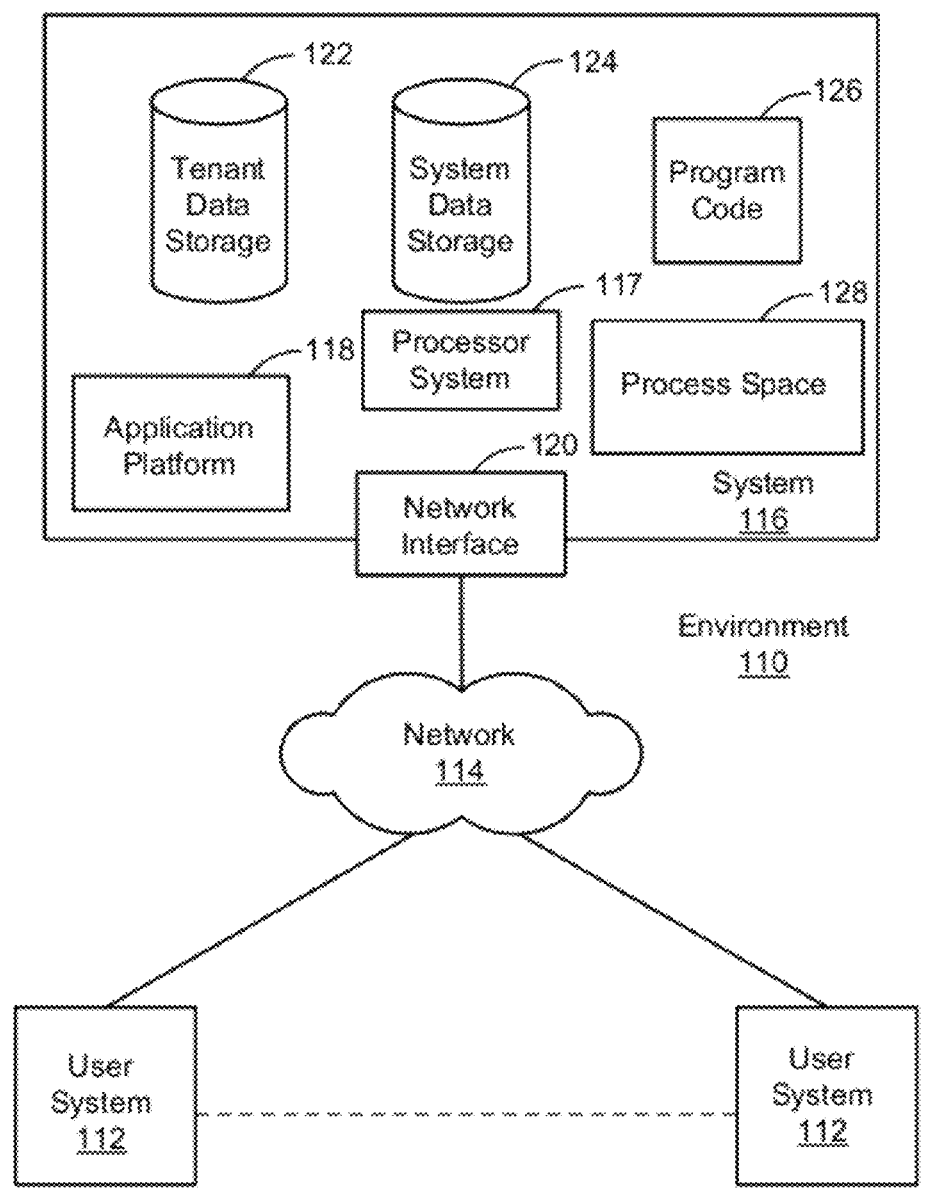
FIG. 1 illustrates a block diagram of an example environment wherein an on-demand database service might be used.

FIG. 1 illustrates a block diagram of an environment 110 wherein an on-demand database service might be used. Environment 110 may include user systems 112, network 114, system 116, processor system 117, application platform 118, network interface 120, tenant data storage 122, system data storage 124, program code 126, and process space 128. In other embodiments, environment 110 may not have all of the components listed and/or may have other elements instead of, or in addition to, those listed above.

Environment 110 is an environment in which an on-demand database service exists. User system 112 may be any machine or system that is used by a user to access a database user system. For example, any of user systems 112 can be a handheld computing device, a mobile phone, a laptop computer, a work station, and/or a network of computing devices. As illustrated in FIG. 1 (and in more detail in FIG. 2) user systems 112 might interact via a network 114 with an on-demand database service, which is system 116.

An on-demand database service, such as system 116, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 116" and "system 116" will be used interchangeably herein. A database image may include one or more database objects. A relational database management system (RDMS) or the equivalent may execute storage and retrieval of information against the database object(s). Application platform 118 may be a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 16 may provide tenant access to multiple hosted (standard and custom) applications, including a CRM application. User (or third party developer) applications, which may or may not include CRM, may be supported by the application platform 118, which manages creation, storage of the applications into one or more database objects and executing of the applications in a virtual machine in the process space of the system 116.

One arrangement for elements of system 116 is shown in FIG. 1, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide webpages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
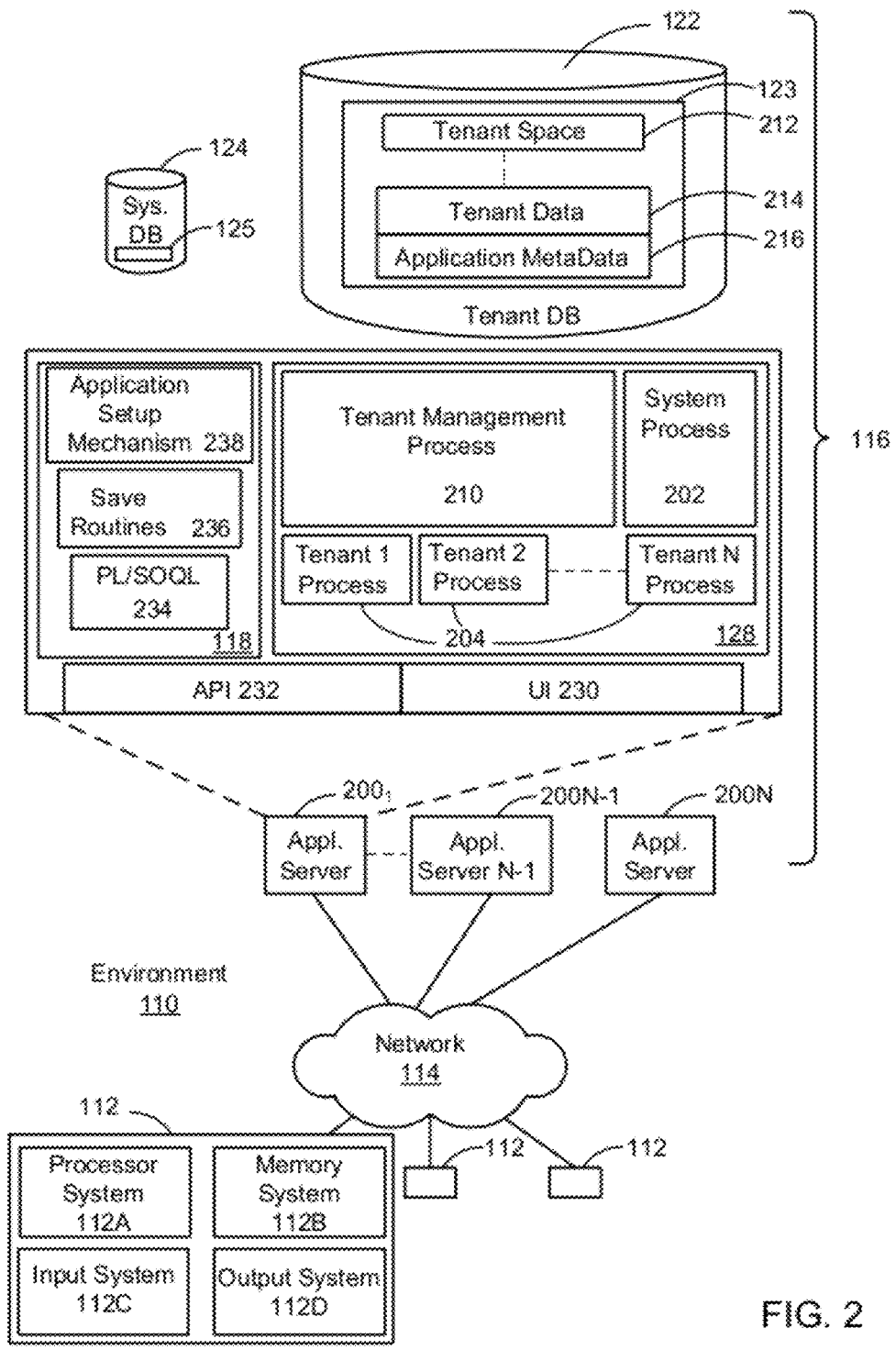
FIG. 2 illustrates a block diagram of example elements of FIG. 1 and various possible interconnections between these elements.

FIG. 2 also illustrates environment 110. However, in FIG. 2 elements of system 116 and various interconnections in an embodiment are further illustrated. FIG. 2 shows that user system 112 may include processor system 112A, memory system 112B, input system 112C, and output system 112D. FIG. 2 shows network 114 and system 116. FIG. 2 also shows that system 116 may include tenant data storage 122, tenant data 123, system data storage 124, system data 125, User Interface (UI) 230, Application Program Interface (API) 232, PL/SOQL 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 1. Regarding user system 112, processor system 112A may be any combination of one or more processors. Memory system 112B may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks. As shown by FIG. 2, system 116 may include a network interface 120 (of FIG. 1) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes to users and/or developers at user systems 112. The tenant data and the system data may be stored in various databases, such as one or more Oracle™ databases.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210 for example. Invocations to such applications may be coded using PL/SOQL 234 that provides a programming language style interface extension to API 232. Invocations to applications may be detected by one or more system processes, which manages retrieving application metadata 216 for the subscriber making the invocation and executing the metadata as an application in a virtual machine.

Each application server 200 may be communicably coupled to database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network interconnect used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multitenant, wherein system 116 handles storage of, and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc., all applicable to that user's personal sales process (e.g., in tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 200 in system 116) automatically generates one or more SQL statements (e.g., one or more SQL queries) that are designed to access the desired information. System data storage 124 may generate query plans to access the requested data from the database.

Example Web Service Testing Framework

Particular embodiments are directed to a web service testing framework that is configured to test a variety of web service protocols and data format types. For example, any suitable web service protocol (e.g., simple object access protocol (SOAP), representational state transfer (REST), etc.), as well as any suitable data format (e.g., extensible markup language (XML), hypertext markup language (HTML), JavaScript object notation (JSON), plain text, etc.) are supported in various implementations. Such a web service testing framework can be used to test, e.g., various web service interfaces for web applications, and bidirectional data transactions to/from disparate web services.

In one embodiment, a method of testing web services using a web service testing framework can include using a data parser to parse data for the web service to be tested. The data parser may be one of a plurality of data parsers in a test library to support a plurality of data formats for the web services. Data validators may also be used to assert web service data. For example, a data validator may be one of a plurality of data validators in a test library for asserting web service data. If the web services are in a SOAP protocol, the data can be converted into framework objects. These framework objects for the SOAP protocol may then be converted into test objects. If the web services are in a REST protocol, the data itself can be converted into the test objects. A web service test can be accessed from the test library for testing the web service, and the web service test can be executed using the test objects. For example, a web service test can access the test library to ensure data integrity, and test objects to send/receive data over the web service.

In this fashion, a wide variety of different web service configurations can be supported. In one or more implementations, both SOAP and REST web service protocols may be supported over any suitable transfer protocol (e.g., hypertext transfer protocol (HTTP), HTTP secure (HTTPS), etc.), and involving any suitable data format types (e.g., XML, HTML, JSON, plain text, etc.). Further, a web service testing framework in particular embodiments may be extendable to support any suitable web service configuration that is not initially covered. In one particular application, the web service testing framework may be utilized by Salesforce customers for testing applications developed on a Salesforce platform.

Particular embodiments provide an ability to read, create, update, and/or delete any "object" used in a web service application. For example, an object query language (e.g., Salesforce object query language (SOQL), etc.) can be used in constructing query strings in order to read, create, update, and/or delete data stored in a cloud arrangement. In addition, any web services description language (WSDL) can be employed to automatically generate corresponding test objects (e.g., Java™ objects) to be used in tests. The use of Java™ test objects allows for interaction of the web service testing framework with a wide variety of web services (e.g., those that support SOAP, REST, etc.).

In one or more implementations, when testing using the web service testing framework, connectivity or data problems may fail in such a way so as to facilitate diagnosis and correction of the underlying problem. For example, various utilities supplied from a test library can be utilized by a test developer to customize web service tests. In addition, various verifications of XML and HTTP data being transferred may be performed. Further, XML or HTTP data that is sent and/or received may be parsed and represented as Java™ objects for creating client applications for testing.

In one or more implementations of the web service testing framework, Java™ test objects may be created based on a given WSDL, such as for a SOAP web service protocol. Such Java™ objects can then be used by various tests to exercise a particular web service. The testing framework may provide an ability to create tests against standard or custom objects with fields that can be directly used, or otherwise extended to access custom fields. Further, an instance of each web service application object can be created, updated, read, and/or deleted, and shared between applications from another source (e.g., a customer, organization, etc.). Instances of objects can be retrieved by or from the framework, or data from a specific field of an object instance, can be retrieved for testing purposes.

In certain embodiments, a web service testing framework provides a web service client (e.g., loaded on user system 112) that can provide data transactions (e.g., in XML, HTML, etc.) over various protocols (e.g., HTTP, secure sockets layer (SSL), etc.) to/from a server (e.g., system 116). For example, the server can be a REST web server, a SOAP web server, or any other suitable web server. Further, interaction may be performed by using HTTP commands (e.g., connect, get, post, put, delete, etc.).

In one or more implementations, data for the testing transactions (e.g., XML data, HTTP data, etc.) can be dynamically created (e.g., created as part of the testing process, via a user interface, etc.), or loaded statically from files (e.g., an XML file). For example, the testing data can be parsed to obtain specific values from that data to be used for validation. Alternatively, an entire data file can be validated by comparing one data file to another data file.

In one or more implementations, the web service testing framework can be packaged or otherwise distributed as a Java™ archive (JAR) file. A JAR file can essentially aggregate many files into one for ease of distribution. Such JAR files may be used to facilitate interaction with other frameworks. For example, the JAR files can be used to distribute Java™ applications or libraries in the form of classes and associated metadata and resources (e.g., text, images, etc.).

Web service testing frameworks of particular embodiments can also be used as a "plug-in" (e.g., test driver) into other automation frameworks for operation as a contributing component. Examples of this particular application for web service testing frameworks in an overall testing framework structure will be discussed below with reference to FIGS. 3 and 4. Further, a web service testing framework of various implementations can also be plugged-in to any other suitable framework, such as those employing a Java™ interface.

Figure 3:
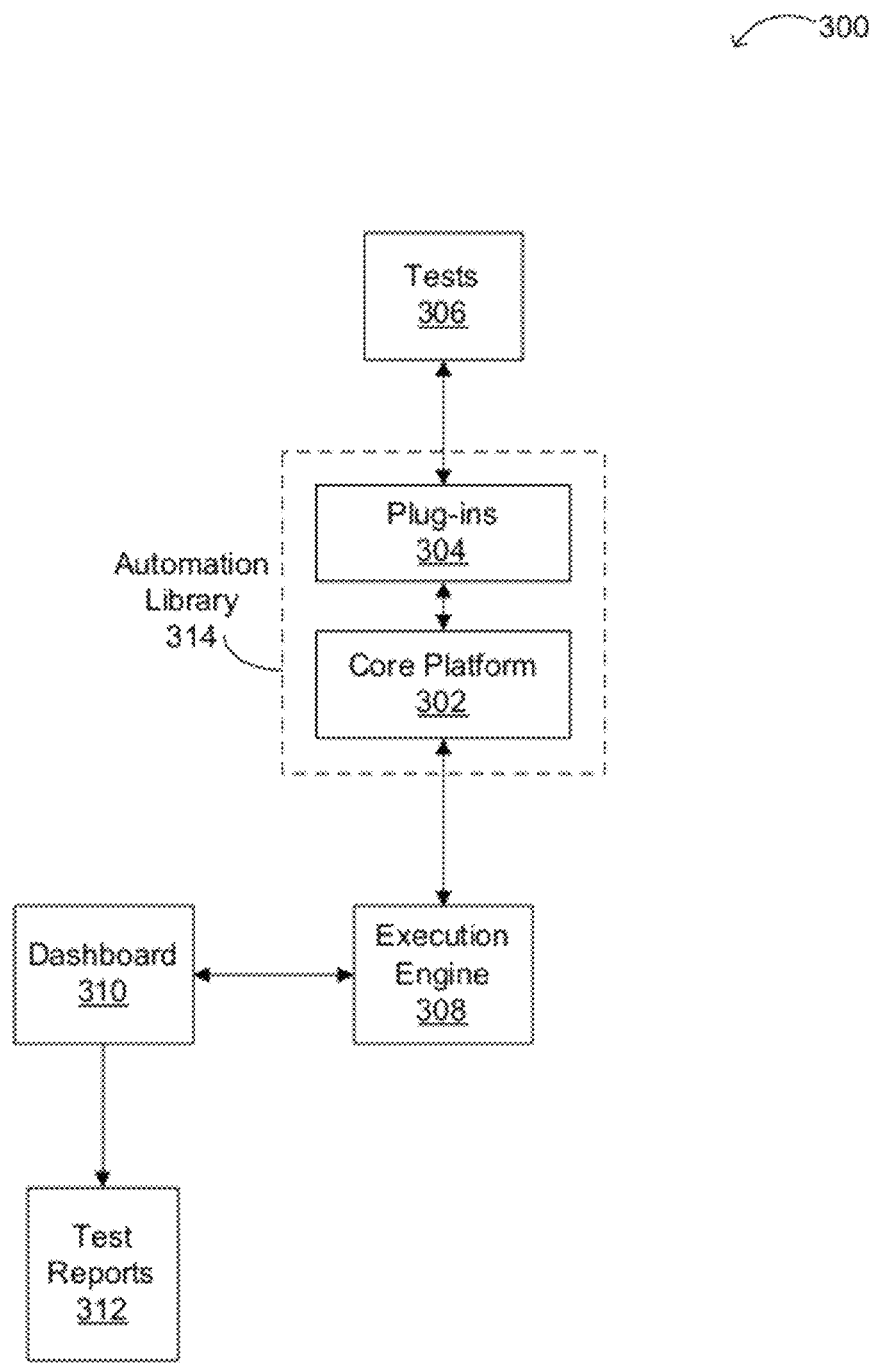
FIG. 3 is a block diagram of an example automation framework structure suitable for web service testing, according to one embodiment.

FIG. 3 shows a block diagram of an example 300 automation framework structure suitable for web service testing, according to one embodiment. Test logs and results may be collected and stored in a configurable repository or "dashboard" 310 for summarized test reporting. The dashboard itself can serve as a user interface for viewing test results, or a separate user interface (e.g., a web browser), such as at a different location, can also access test results via the dashboard/repository. Execution engine 308 can be used for scheduling, executing, and collecting test artifacts. For example, execution engine 308 can be any suitable server or computing device.

A particular example automation framework can also include automation library 314, which can be a library of utilities and tools used to form a core logic or "core platform" of automation framework and tests. In addition, a separate administrator interface can provide access either directly to tests 306, or via execution engine 308, and may be used, e.g., for writing or otherwise generating test scripts for tests 306. Tests 306 can also utilize software configuration management (SCM) for tracking and controlling changes (e.g., via revision control and baseline establishment) in the software, and for accessing the latest test cases.

Various implementations of the test framework can also be used to generate any suitable test reports 312. Examples of such test reports include test trend reports, test result reports, as well as graphical data to provide test results in summarized form. Further, various aspects of the test result reporting are configurable by a user (e.g., via a user interface, dashboard 310, etc.). One or more implementations provide for user configurability of summation forms of test result data (e.g., test statistics grid/chart, test trends, job statistics, build statistics, build executor status, build queue, etc.) for test reports 312. Various implementations also provide many other user configurations related to testing control and reporting. For example, real-time email, instant messages, and/or RSS feeds of testing status or other such notifications, can be configured.

In one implementation, an automation framework can include an automation server or execution engine (e.g., 308), an automation library (e.g., 314), and an automation dashboard (e.g., 310). Execution engine 308 can include a server and/or a web application that may be installed on any web server container. Execution engine 308 may also be configured to run jobs based on custom configurations. For example, such jobs that may be run on execution engine 308 include build, test, and deployment operations.

In one implementation, automation library 314 can include a Java™ archive for creating tests, loading test data, test execution drivers, logging, and verifying results. In this and other implementations, dashboard 310 can be used for categorizing and defining tests (e.g., via user configurable inputs), as well as collecting test status from each execution and archiving associated results. Such test results can be used by dashboard 310 to provide various test reports 312 (e.g., custom graphical analysis reports). This framework can also run tests on-demand, scheduled, and/or based on a triggered event, and may also run tests in parallel by pooling requests and distributing the tests to test clients for execution.

Automation library 314 can also include core platform 302 and plug-ins 304. Plug-ins 304 can be used to extend the automation library to support any number of tests 306. For example, various tests 306 can represent different product lines or layers of a product, application, or service. Plug-ins 304 can provide for an integrated system of self-contained modular testing components built upon a shared core platform. These pluggable components may act together as building blocks that provide test coverage for different layers (e.g., GUI, API, web service, database, network, etc.) of the product. Thus in various implementations, in order to support a new test, a new plug-in 304 can be added to extend the reach of core platform 302. Plug-ins 304 thus allow for integration of each type of testing tool. Once the test tools are defined for a particular product, plug-ins 304 can be identified or created to integrate the defined test tools (e.g., tests 306) into core platform 302. In this fashion, automation framework is tool agnostic and extensible because each such test tool can be coupled with core platform 302 by use of appropriate plug-in 304.

The test framework in various implementations can also execute build or deployment tasks, where each job (e.g., build, test, deployment, etc.) may be configured as self-contained tasks that can trigger other jobs and provide execution results. In various implementations, such a job (e.g., a deployment or a test run) can be used as an event to trigger another job. A user can configure which specific jobs or types of jobs may be specified as an event for such event triggered operation. For example, a user can specify that a first test is an event, and that a second test is to run based on occurrence of the first test (e.g., an event trigger). Any number of such event definition and triggering can be supported in particular embodiments.

In addition, the automation framework may be controlled by a centralized dashboard 310, whereby tests definitions and test results are archived. Further, tests can be parameterized with test data (e.g., using XML, comma-separated values (CSV), etc.) to supply test input. Such input test data can be provided via dashboard 310, or via any other suitable interface, to execution engine 308. For example, a file of test input can be accessed by (e.g., from a memory location or database) or otherwise sent to execution engine 308. Further, default test inputs, such as those derived from previous test runs of the same test, can also be utilized as test input data by execution engine 308.

Figure 4:
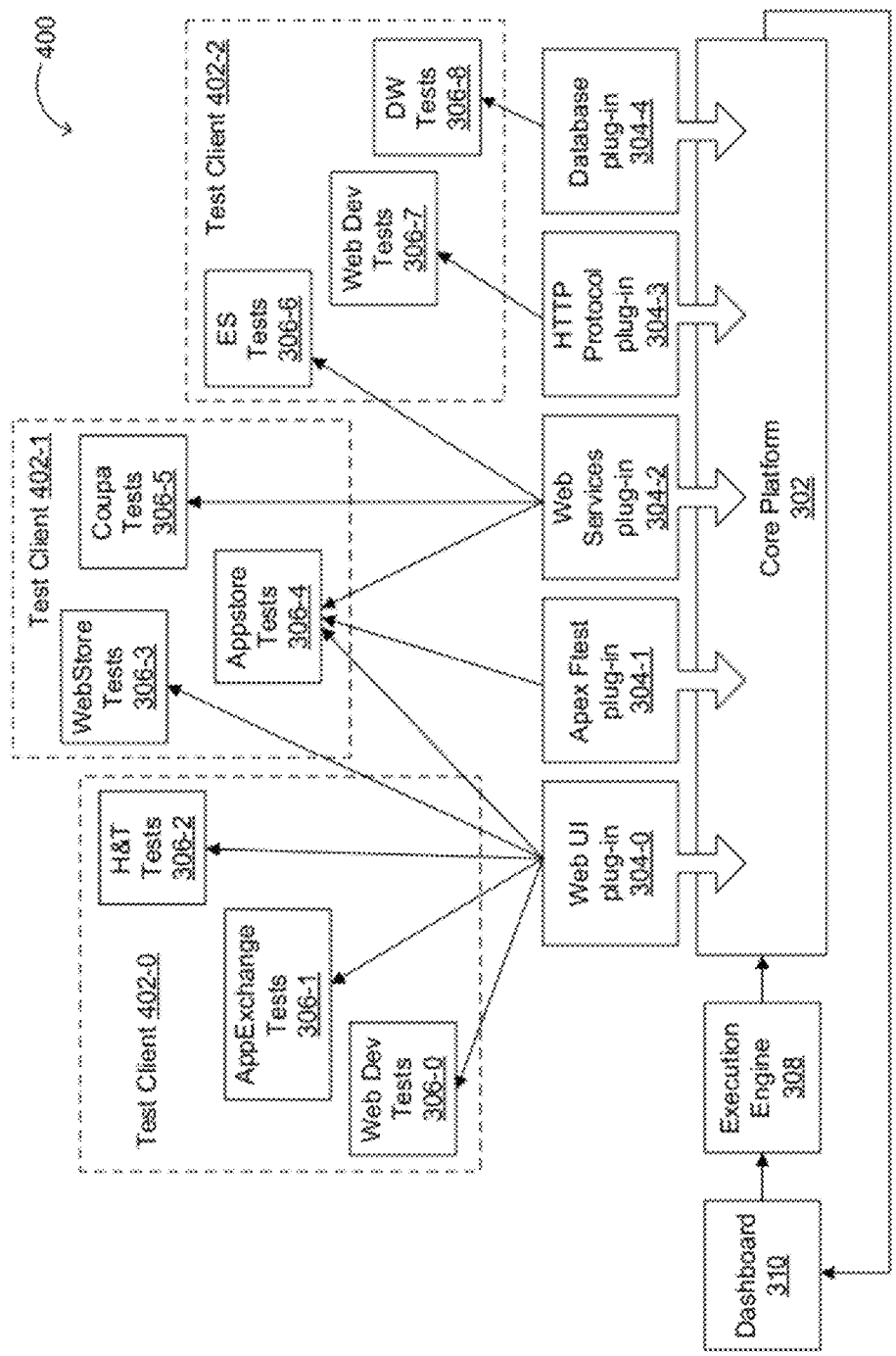
FIG. 4 is a block diagram of example automation framework structure with web services plug-ins, according to one embodiment.

FIG. 4 shows a block diagram of an example 400 automation framework structure with web service plug-ins, according to one embodiment. As discussed above, a test framework can include an automation server or execution engine 308, an automation or repository dashboard 310, and an automation library 314. Dashboard 310 can be used for selecting from among tests 306 to be run. Other test definitions (e.g., which product layers are to be tested, which test tools are to be utilized, etc.), as well as user configurations (e.g., test scheduling, notification enabling, customizing test reports, test client controls, archiving controls, etc.), can also be specified via dashboard 310. In this fashion, selected tests can be executed (e.g., via execution engine 308) on-demand and/or scheduled, and according to such user configurations.

Alternatively or in addition to tests being executed on execution engine 308, a pool of available client machines may be used to execute separate layers of a product, to represent separate environments for the product, or for any other suitable execution arrangement. In addition, test descriptions, user configurations, and results can be stored in dashboard 310. In one or more implementations, user configurations can be stored in association with a user interface (e.g., in user system 112) and/or in association with dashboard 310 (e.g., in system 116), or any suitable associated storage.

In order to accommodate operating system independence, in one implementation, the test framework can be built upon Java™ technology. Use of Java™ technology can allow the framework to run on a variety of major operating system platforms. In addition, core platform code can be installed and updated as a JAR file. Such a test framework can also be built on a componentized modular design and a shared library, thus allowing additional modules for extension of new features.

Automation library 314 can include core platform 302 and plug-ins 304. Core platform 302 can include an automation library of shared tools and utilities to perform core testing functionality. Plug-ins 304 can include test drivers tailored to execute, or otherwise integrate, specific types of tests via core platform 302. For example, plug-ins 304 can target various aspects of a particular product or layer of the product. In some implementations, one or more of tests 306 may be provided by other vendors, and are made to work with core platform 302 by incorporating an appropriate plug-in 304. Also in some implementations, one plug-in 304 may service a variety of different tests 306. Each plug-in 304 may also be intended to test a particular layer of a product. Further, plug-ins 304 may be directed to particular layers, environments, and/or test tool vendors, in order to facilitate product testing across desired layers and environments associated with that product.

Any number of plug-ins 304 can be coupled to core platform 302 in order to support any number of suitable tests. Further, any number of test clients 402 can be utilized for executing various groupings of tests 306, such as by use of corresponding distributed (e.g., virtual) machines. For example, web user interface (UI) plug-in 304-0 can include test drivers for executing tests, such as web development tests 306-0, AppExchange tests 306-1, help and training (H&T) tests 306-2, WebStore tests 306-3, and Appstore tests 306-4. Test client 402-0 can include web development tests 306-0, AppExchange tests 306-1, and H&T tests 306-2. Also for example, Apex Ftest plug-in 304-1 can include test drivers for executing tests, such as Appstore tests 306-4. H&T tests 306-2 can, e.g., test a portal application. Also for example, web services plug-in 304-2 can include test drivers for executing tests, such as Appstore tests 306-4, Coupa tests 306-5, and employee success (ES) tests 306-6. Test client 402-1 can include WebStore tests 306-3, Appstore tests 306-4, and Coupa tests 306-5. Also, HTTP protocol plug-in 304-3 can include test drivers for executing tests, such as web development tests 306-7, and database plug-in 304-4 can include test drivers for executing tests, such as data warehouse (DW) tests 306-8. Test client 402-2 can include ES tests 306-6, web development tests 306-7, and DW tests 306-8. In addition, and as illustrated with respect to Appstore tests 306-4, one or more plug-ins may contain test drivers for this test or product line. As can be seen in the example of FIG. 4, one plug-in may support more than one test client, such as web services plug-in 304-2 supporting test clients 402-2 and 402-3.

Any suitable technologies can be utilized in one or more implementations of an automated test framework. For example, a Selenium/HTML unit can be used for web UI testing, JUnit/TestNG for test drivers and/or API testing, Apache Axis can be used for SOAP web service testing, XMLUnit can be used for differentiating and validating XML data, Apache HTTPComponents can be used for HTTP and REST web service testing, Spring/JDBC can be used for database testing, Ant can be used to execute build, test, and deploy jobs, DOM4j can be used for parsing XML and HTML data, Log4j can be used for logging test data, Hudson (or any suitable tool of choice) can be used for continuous integration, and Perforce (or any suitable tool of choice) can be used source control management.

Figure 5:
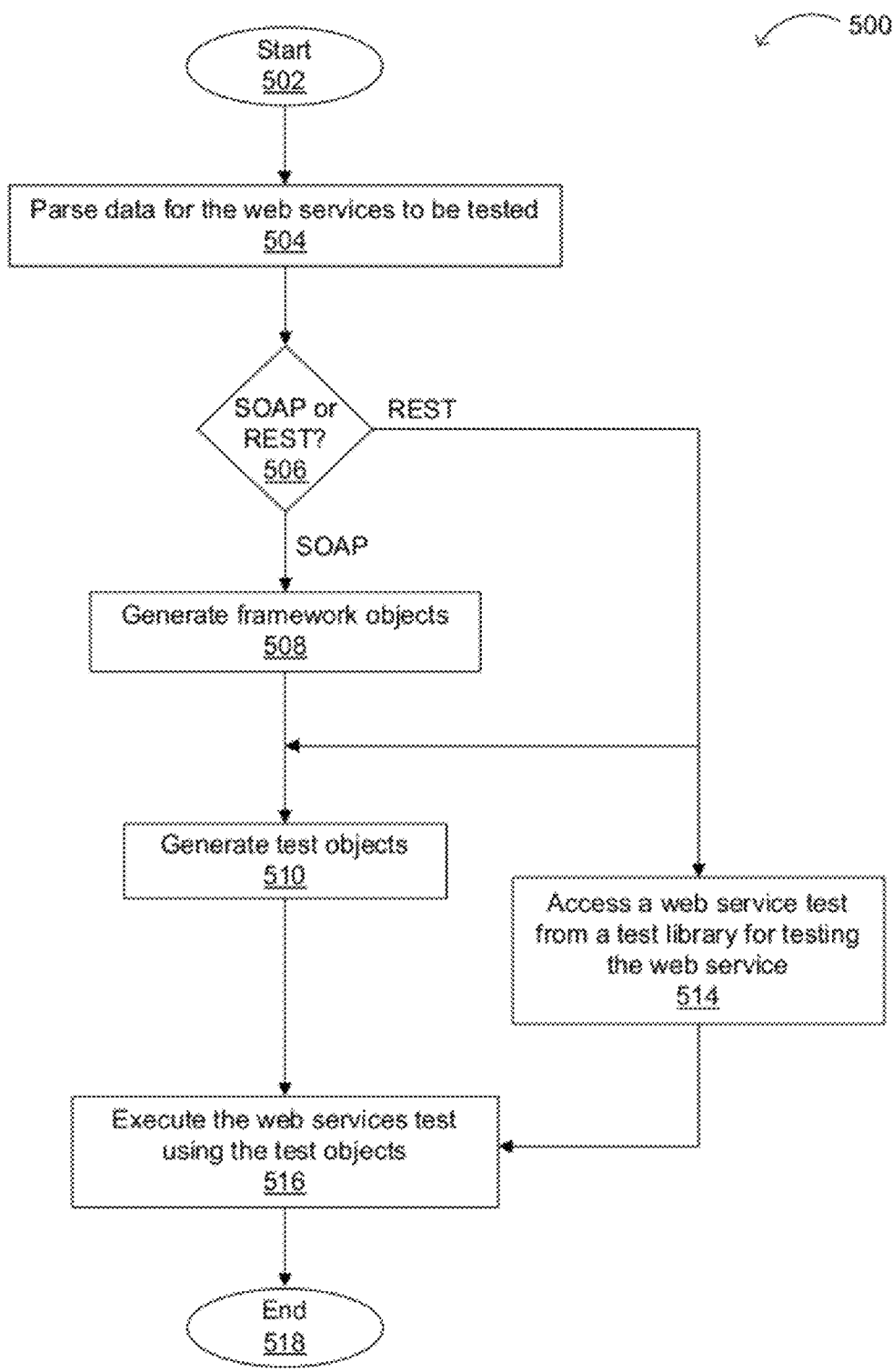
FIG. 5 is a flow diagram of an example method of testing web services using a web service testing framework, according to one embodiment.

FIG. 5 illustrates a flow diagram of an example method 500 of testing web services using a web service testing framework, according to one embodiment. The flow can begin (502), and data for the web service to be tested can be parsed (504). As discussed above, such testing data can be received from a test file, or otherwise generated for a particular web service test. The data can be parsed using a data parser that is one of a plurality of data parsers in a test library for support of a plurality of data formats for the web services. For example, packets of data can include headers to be used for determining which data format, and thus which associated data parser, is to be used for that web service test.

A protocol of the web service under test may also be determined in one or more implementations. For example, packet header information, or other suitable settings or indicators can be utilized to perform this protocol determination. Various embodiments support a wide variety of such web service protocols and data formats. If the web services are in a SOAP protocol (506), the data can be converted into framework objects, or such framework objects can otherwise be generated (508). These framework objects for the SOAP protocol may then be converted into test objects, or these test objects can otherwise be generated (510). If the web services are in a REST protocol (506), the data itself can be converted into the test objects, or the test objects can otherwise be generated (510). It is the test objects that may be used in the actual web service test in various implementations. A web service test can be accessed from the test library for testing the web service (514). The web service test can be executed using the test objects (516), completing the flow (518).

As will be discussed in more detail below, in addition to data parsers, other utilities can be accessed from the test library in order to generate and/or execute the web service test, such as validating or comparing data sent/received via the web service. For example, data validators may also be used to assert web service data. In various implementations, a data validator may be one of a plurality of data validators in a test library for asserting web service data. For example, a web service test can access the test library to ensure data integrity, and test objects to send/receive data over the web service.

Figure 6:
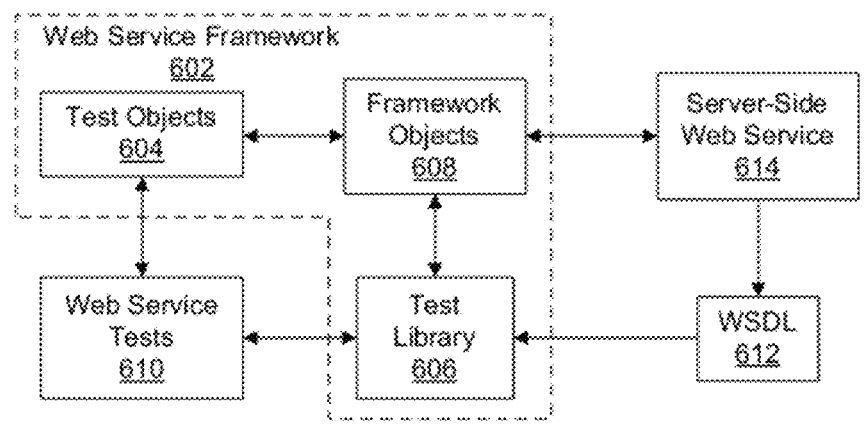
FIG. 6 is a block diagram of an example testing framework architecture for SOAP web services, according to one embodiment.

FIG. 6 shows a block diagram of an example testing framework architecture 600 for SOAP web services, according to one embodiment. A SOAP web service protocol can primarily include data formats in XML. However, any other suitable data format can also be accommodated within the SOAP protocol, or other web service protocols. Web service framework 602 can include test objects 604, test library 606, and framework objects or web service bindings 608. For example, server-side web service 614 may be a third party or other company that also provides WSDL 612. WSDL 612 may provide a description of what services are available through web service 614. In operation, WSDL 612 can be imported from a server-side (e.g., system 116) to a client-side (e.g., user system 112), to provide service definition. WSDL 612 can then be converted into web service bindings, or raw bindings, in framework objects 608 (e.g., via utilities in test library 606). In various implementations, framework objects 608 may be Java™ objects, or any other suitable web service bindings.

In order to facilitate use of web service bindings in framework objects 608, test objects 604 can be generated from framework objects 608. Test objects 604 can essentially be built to wrap around framework objects 608, and thus provide a layer of abstraction to facilitate web service bindings use per framework objects 608. For example, if WSDL 612 changes, framework objects 608 can be regenerated without affecting web service tests 610. This is because web service tests 610 utilize test objects 604 instead of directly using framework objects 608 when performing a test. Without this additional level of abstraction provided by test objects 604, any changes made to WSDL 612 might result in unintended test operations being performed. Thus, changes are essentially taken care of by use of framework objects 608, and web service tests need not be rewritten after every WSDL 612 change.

A web service test 610, or portions thereof (e.g., utilities), can be accessed via test library 606. As discussed above, a web service test 610 can utilize generated test objects 604 to execute the particular web service test. Web service data for an application to be tested can be accessed via server-side web service 614. Because a wide variety of formats for the web service data may be supported, data parsers can be employed to understand data from WSDL 612 and/or server-side web service 614, and feed into a converter for conversion into framework objects 608 and/or test objects 604. For example, an appropriate data parser can be accessed from test library 606, such as by test objects 604. Further, WSDL 612 can be used to define available web services, or otherwise describe aspects of the web service to be tested from server-side web service 614.

Test objects 604 may remain substantially the same, where framework objects 608 can vary along with a change in protocol connections. For example, an API from a company could change, and Java™ objects in framework objects 608 may automatically be updated as a result. Thus, a suitable layer of abstraction is formed by WSDL 612 first being converted into framework objects 608, which can then be converted into test objects 604. A user of a test tool may use test objects 604, whereby remaining objects reside substantially in framework objects 608. In addition, custom platforms (e.g., for different abstraction layers, different web service descriptors, etc.) can also be supported in particular embodiments.

Test library 606 may be accessed by test objects 604, as well as by a writer or generator of web service tests 610. Test library 606 may provide any number of utilities (e.g., data parsers, data verifiers, data comparators, general-purpose utilities, etc.) to facilitate web service test development and/or execution. For a SOAP web service protocol, actual data may be sent and received over HTTP in an XML data format. For this particular example, data coming in and out of web service framework 602 may use a "schema" to describe how to read this XML. Tools in test library 606 may provide for reading of the schema to determine how to parse the XML data. Thus, utilities available in web service framework 602 (e.g., data parsers utilities in test library 606) can be utilized in development and/or operation of web service tests 610. Such utilities need not be rewritten by each user of web service framework 602.

One example test object can relate to login for a particular web service, such as a Department of Motor Vehicles (DMV) web service. For example, if a person logs in to such a DMV web service, an associated test login can automatically be created as a Java™ object communicating with DMV. Thus, a Java™ test object can pass some data to a corresponding object (e.g., a login object), and can also expect a response (e.g., successful login or not). A Java™ object can also represent features or functions (e.g., an account) of a particular web service. Further, attributes associated with the objects can include sub-functions that may cause data to be moved around to/from the account.

Figure 7:
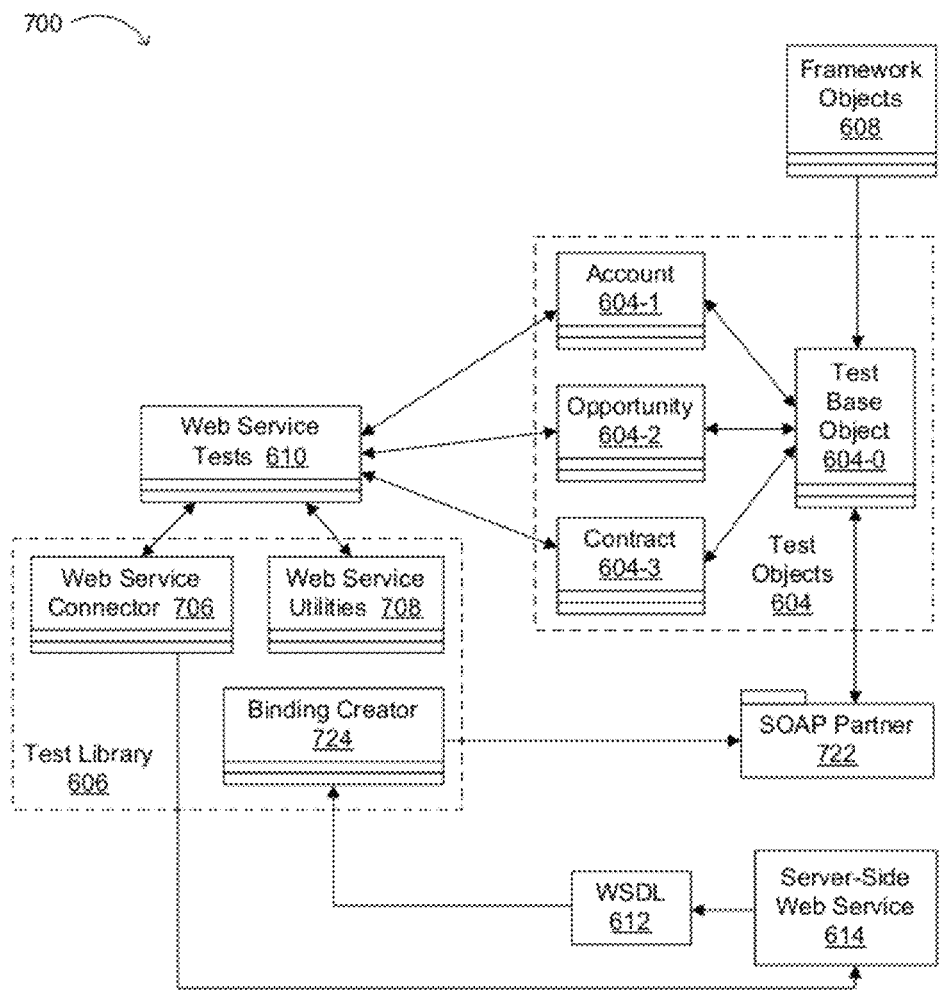
FIG. 7 is a block diagram of an example SOAP web service testing framework flow and arrangement, according to one embodiment.

FIG. 7 shows a block diagram of an example 700 SOAP web services testing framework flow and arrangement, according to one embodiment. Web service test 610 can interact with web service connector 706 and web service utilities 708, which are part of test library 606. For example, web service utilities 708 can allow for testing of either SOAP or REST web service protocols. Web service utilities 708 may also provide for reduced development time for generating test code to test the web service.

Various company or organization (e.g., Oracle, IBM, tenants in a multi-tenant system, etc.) implementations of SOAP or REST protocols can be tested, such as by utilizing an appropriate utility (e.g., via web service utilities 708). Here, WSDL 612 can be used in converting data via such utilities 708 and/or binding creator 724 to framework objects 608. For example, SOAP partner 722 may be part of framework objects 608, or otherwise interface with test objects 604 via test base object 604-0. Thus, a test generator may write a test (e.g., web service test 610) in Java™, WSDL 612 can define an API for the particular web service to be tested, and test interaction can be performed via test objects 604. For example, web service test 610 may be written in a Java™ native language, and two layers of abstraction (e.g., via test objects 604 and framework objects 608) can be utilized from that native test language. Framework objects 608 can be converted into a protocol suitable for interacting with another company's web services (e.g., via web service bindings at SOAP partner 722). Thus, one layer of abstraction can be used to convert to test objects, and another layer of abstraction may be to provide conversion to transfer to a remote web service (e.g., at server-side web service 614). For example, while web service testing framework 602 can be implemented in Java™, the framework 602 can communicate with applications that are in another language (e.g., Apex), thus providing support for third-party web-based applications.

WSDL 612 may be provided by a service provider of the particular web service to be tested, and a call from web service framework 602 can be made in order to receive the WSDL 612 file for conversion into framework objects 608. For example, WSDL 612 can be accessed by server-side web service 614, and may utilize binding creator 724 for conversion into framework objects 608. Further, Java™ binding stubs from WSDL 612 can be formed in SOAP partner 722, which can represent any company or other party. In this fashion, binding creator 724 can convert WSDL 612 into Java™ bindings in association with framework objects 608 at SOAP partner 722. In this fashion, any WSDL or other type of descriptive language can be supported by using such raw Java™ bindings, or other such objects.

As discussed above, framework objects 608 can be derived from WSDL 612, and test objects 604 can be derived from framework objects 608. Test base object 604-0 can also be coupled to an object behavior interface that indicates how various test objects operate, such as which methods are available via those particular test objects. Other test objects 604, which may be accessed as part of the web service testing, can include test objects account 604-1, opportunity 604-2, and contract 604-3. In one example arrangement, test base object 604-0 can be leveraged or otherwise used for generation of test objects account 604-1, opportunity 604-2, and contract 604-3. Test library 606 can include web service connector 706 and web service utilities 708, which can be utilized by web service tests 610 to facilitate generation and/or execution of web service tests 610.

Figure 8:
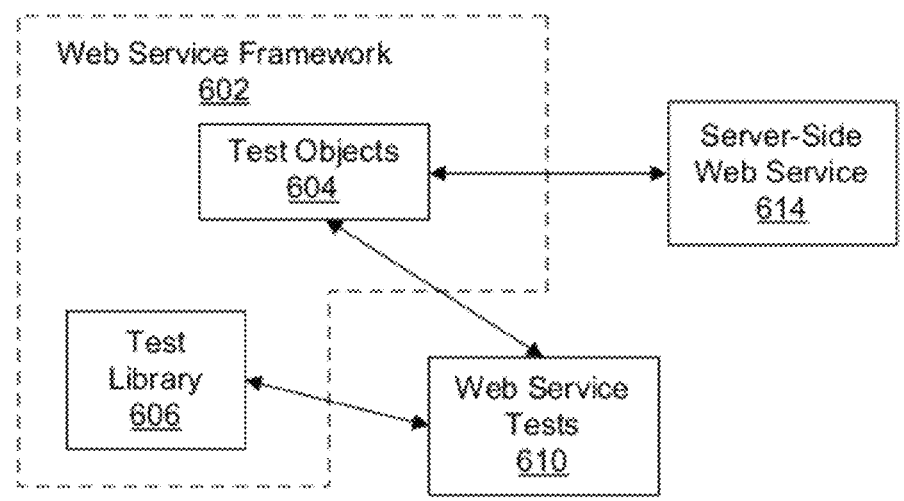
FIG. 8 is a block diagram of an example testing framework architecture for REST web services, according to one embodiment.

FIG. 8 shows a block diagram of an example testing framework architecture 800 for REST web services, according to one embodiment. A REST web service protocol can include data being sent in a variety of different formats (e.g., XML, JSON, plain text, etc.). REST protocols can utilize HTTP request and response messaging. In this example, web service framework 602 can include test objects 604 and test library 606. Further, data from server-side web service 614 can be used to generate test objects 604. In addition, web service tests 610 can be accessed from test library 606, and test objects 604 can be utilized in execution of the particular web service test.

Thus in REST web service protocols, test objects 604 can be more directly used for testing the server-side web service 614. Data may be embedded in, e.g., HTTP, and sent across the interface between web service framework 602 and server-side web service 614. Because this HTTP communication for REST web service protocols can support XML, plain text, JSON, etc., an appropriate data parser can be accessed from test library 606. Thus, test library 606 can be used in order to read HTTP packets, and pull out the parsed data (e.g., plain text) to be used for the particular web service test 610. For example, in an HTTP packet, a header that indicates whether the data format therein is plain text, XML, etc., can be accessed, and this header identification can be used for determining an appropriate data parser from test library 608 for performing proper conversions for the data. In this fashion, REST web service protocol support is provided in various embodiments for plain text, XML, JSON, etc., can be accommodated such that data sent/received via HTTP packets to/from server-side web service 614 or other web server.

Figure 9:
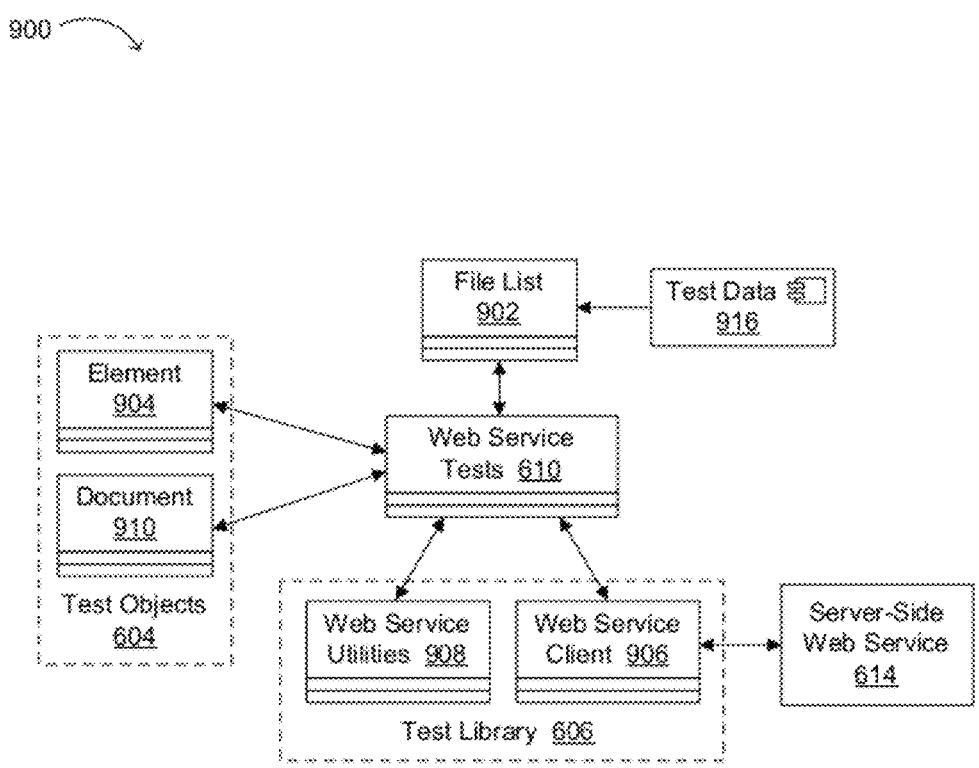
FIG. 9 is a block diagram of an example REST web service testing framework flow and arrangement, according to one embodiment.

FIG. 9 shows a block diagram of an example 900 REST web service testing framework flow and arrangement, according to one embodiment. Web service test 610 can access web service client 906, and may utilize web service utilities 908, in test library 608 for generation and/or execution of web service tests 610. In this particular example, test data 916 (e.g., XML, JSON, text, etc.) can represent the data to be sent and received over REST as part of a REST-based web service test 610. Thus, a web service test 610 in operation may send and/or receive data obtained from test data 916 over the web service to be tested. A web test generator or author may also read in test data 916, and leverage tests and/or utilities (e.g., web service client 906 and web service utilities 908) in test library 606.

In addition, test objects 604 generated as discussed above, can include element 904 and document 910. An example web service test may then access test data 916 via file list 902 (e.g., over HTTP), and then use test objects 604 to send and receive data over the web service to be tested. In one or more implementations, file list 902 may also be part of test library 606. As shown, element 904 and 910 can be part of test objects 604, and may be used to verify, e.g., received XML files, as well as send XML files to server-side web service 614. In this example, test data 916 can thus represent data desired to be communicated with the web service. This data (shown here on a client side) can be imported over HTTP, and sent to a remote service or server-side web service 614. In this fashion, web service test 610 can be generated using web service framework 602, and by utilizing web service client 906 and utilities 908 that are part of test library 606 of the web service framework.

In one or more implementations, a web service testing framework can be built on a Java™ and Web 2.0 technology based architecture, thus reducing installation requirements as compared to other approaches. Particular embodiments also allow for integration with any test content repository, defect management system, as well as any suitable continuous integration (CI) tool, resulting in increased flexibility. In addition, certain embodiments provide modular and extensible testing by accommodating testing of different products, web service protocols, data types, application layers, as well as different types of testing.

Various embodiments also provide agnostic testing of web service applications, such as in a cloud arrangement, or in a client/server arrangement. Any web service application can be tested in a cloud and/or client/server mode. In addition, aspects of various implementations may be browser and platform independent, and can also run in a distributed environment using virtual machines or test clients.

Thus, particular embodiments provide an ability to test different protocols and data format types related to a web service application. In one particular order management example, an opportunity for a billing business process can include multiple sub-processes, such as user interface, API, and/or web service calls between systems and transactional data processing (bulk) with database commits. One or more implementations as described herein may be effectively used to create tests for testing various aspects of web services, and ensuring transactional data integrity across a variety of data formats and protocols.

Figure 10:
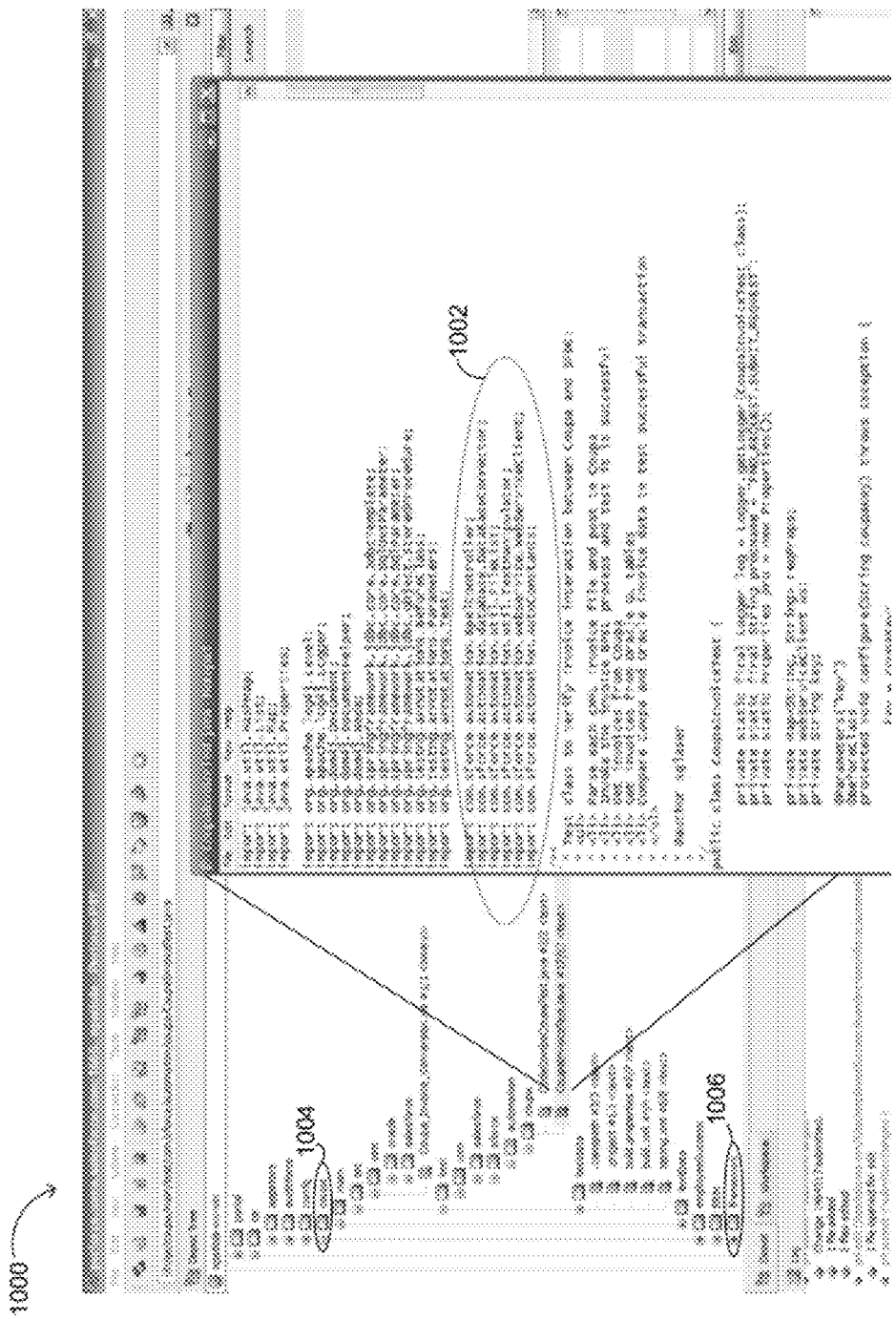
FIG. 10 is a screenshot showing an example usage of framework utilities, according to one embodiment.

FIG. 10 shows a screenshot example 1000 usage of framework utilities, according to one embodiment. As illustrated, for a Coupa invoice test (e.g., Coupa tests 306-5) for a corresponding product test automation 1004, test script references can import various framework utilities 1006. For example, framework utilities 1002 can be used in Coupa tests 406-5, which also utilize web services plug-in 304-2. Framework utilities 1002 can essentially use the plug-ins as part of core platform 302. In this fashion, the web service testing framework may be called (e.g., 1004) from within the test script, such as for testing the Coupa end-to-end solution.

Various aspects of particular embodiments can be implemented using any suitable function, tool, application, code, add-on, etc., to a website or navigation tool, such as a special cookie that may be configured on the website. The code may be downloaded from a server to a client, from system 116 to user system 112, and/or from any suitable arrangement. As discussed above, such code to implement various aspects of particular embodiments can include any suitable programming language (e.g., HTML, Apex, C, Javascript, etc.).

In a multi-tenant database system, a database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java™, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer implemented method of testing web services using a web service testing framework, the method comprising:
    using a data parser to parse data for the web service to be tested, wherein the data parser is one of a plurality of data parsers in a test library configured to support a plurality of data formats for the web service;
    determining if the web service is in a simple object access protocol (SOAP) protocol or a representational state transfer (REST) protocol;
    converting the data into framework objects if the web service is in the SOAP protocol;
    converting the framework objects into test objects if the web service is in the SOAP protocol such that the test objects wrap around the framework objects with web service bindings to provide a layer of abstraction between the framework objects and the test objects, wherein the data for the SOAP protocol comprises web services description language (WSDL);

converting the data directly into the test objects if the web service is in the REST protocol;

accessing a web service test from the test library for testing the web service; and executing the web service test using the test objects.

2. The computer implemented method of claim 1, wherein the data for the web service protocol is communicated by using hypertext transfer protocol (HTTP) or HTTP secure (HTTPS), and wherein the data for the web service to be tested is accessed from a multi-tenant database.

3. The computer implemented method of claim 1, wherein the plurality of data formats supported by the plurality of data parsers comprise extensible markup language (XML), hypertext markup language (HTML), JavaScript object notation (JSON), and plain text.

4. The computer implemented method of claim 1, wherein the test objects and the framework objects comprise Java™ objects.

5. The computer implemented method of claim 1, wherein the data parser is accessed from the test library using the test objects.

6. The computer implemented method of claim 1, further comprising:

accessing one or more utilities from the test library for generating the web service test.

7. The computer implemented method of claim 1, further comprising:

connecting the web service testing framework as a plug-in to another testing framework.

8. An apparatus for testing web services using a web service testing framework, the apparatus comprising:

a processor; and one or more stored sequences of instructions which, when executed by the processor, cause the processor to carry out:

using a data parser to parse data for the web service to be tested, wherein the data parser is one of a plurality of data parsers in a test library configured to support a plurality of data formats for the web service;

converting the data into framework objects if the web service is in a simple object access protocol (SOAP) protocol;

converting the framework objects into test objects if the web service is in the SOAP protocol such that the test objects wrap around the framework objects with web service bindings to provide a layer of abstraction between the framework objects and the test objects, wherein the test objects and the framework objects comprise Java™ objects, and the received data for the SOAP protocol comprises web services description language (WSDL);

converting the data directly into the test objects if the web service is in a representational state transfer (REST) protocol;

accessing a web service test from the test library for testing the web service; and executing the web service test using the test objects.

9. The apparatus of claim 8, wherein the data for the web service protocol is communicated by using hypertext transfer protocol (HTTP) or HTTP secure (HTTPS).

10. The apparatus of claim 8, wherein the plurality of data formats supported by the plurality of data parsers comprise extensible markup language (XML), hypertext markup language (HTML), JavaScript object notation (JSON), and plain text.

11. The apparatus of claim 8, wherein the instructions when executed further cause the processor to carry out:

accessing one or more utilities from the test library for generating the web service test.

12. The apparatus of claim 8, wherein the instructions when executed further cause the processor to carry out:

connecting the web service testing framework as a plug-in to another testing framework.

13. A non-transitory computer-readable storage medium having one or more instructions thereon for testing web services using a web service testing framework, the instructions when executed by one or more processors causing the one or more processors to carry out:

using a data parser to parse data for the web service to be tested, wherein the data parser is one of a plurality of data parsers in a test library configured to support a plurality of data formats for the web service;

determining if the web service is in a simple object access protocol (SOAP) protocol or a representational state transfer (REST) protocol;

converting the data into framework objects if the web service is in the SOAP protocol;

converting the framework objects into test objects if the web service is in the SOAP protocol such that the test objects wrap around the framework objects with web service bindings to provide a layer of abstraction between the framework objects and the test objects, wherein the test objects and the framework objects comprise Java™ objects, and the data for the SOAP protocol comprises web services description language (WSDL);

converting the data directly into the test objects if the web service is in the REST protocol;

accessing a web service test from the test library for testing the web service; and executing the web service test using the test objects.

14. The non-transitory computer-readable storage medium of claim 13, wherein the data for the web service protocol is communicated by using hypertext transfer protocol (HTTP) or HTTP secure (HTTPS).

15. The non-transitory computer-readable storage medium of claim 13, wherein the plurality of data formats supported by the plurality of data parsers comprise extensible markup language (XML), hypertext markup language (HTML), JavaScript object notation (JSON), and plain text.

16. The non-transitory computer-readable storage medium of claim 13, wherein the instructions when executed further cause the one or more processors to carry out:

accessing one or more utilities from the test library for generating the web service test.

17. The non-transitory computer-readable storage medium of claim 13, wherein the instructions when executed further cause the one or more processors to carry out:

connecting the web service testing framework as a plug-in to another testing framework.

* * * * *